US011323029B2

(12) United States Patent
Elkholy et al.

(10) Patent No.: US 11,323,029 B2
(45) Date of Patent: May 3, 2022

(54) SYSTEM AND METHOD OF AUTOMATIC CALIBRATION TO MAXIMIZE LOAD CURRENT SUPPORT OF DC-DC CONVERTER OPERATING IN PULSE-PAIRING MODE

(71) Applicant: Silicon Laboratories Inc., Austin, TX (US)

(72) Inventors: Mohamed Elkholy, College Station, TX (US); Anil Shirwaikar, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 209 days.

(21) Appl. No.: 16/857,901

(22) Filed: Apr. 24, 2020

(65) Prior Publication Data

US 2021/0336539 A1 Oct. 28, 2021

(51) Int. Cl.
| H02M 3/158 | (2006.01) |
| H02M 1/088 | (2006.01) |
| H02M 1/32  | (2007.01) |
| H02M 1/44  | (2007.01) |
| H02M 1/14  | (2006.01) |
| H04B 1/40  | (2015.01) |
| H02M 1/00  | (2006.01) |

(52) U.S. Cl.
CPC .......... *H02M 3/158* (2013.01); *H02M 1/088* (2013.01); *H02M 1/0058* (2021.05); *H02M 1/44* (2013.01); *H04B 1/40* (2013.01)

(58) Field of Classification Search
CPC ...... H02M 3/158; H02M 1/0058; H02M 1/44; H02M 1/0032; H02M 1/14
See application file for complete search history.

(56) References Cited

U.S. PATENT DOCUMENTS 10,128,857 B1    11/2018  Elkholy et al.
10,263,523 B1 *   4/2019  Sonntag ................. H03M 5/08
(Continued)

FOREIGN PATENT DOCUMENTS

CN    103683869 A  *  3/2014  ............ H02M 3/156
CN    111555629 A  *  8/2020
(Continued)

*Primary Examiner* — Sisay G Tiku
(74) *Attorney, Agent, or Firm* — Gary Stanford; Huffman Law Group, PC (57) ABSTRACT

A DC-DC converter including converter circuitry, a voltage detector providing a low voltage signal, and pulse-pairing circuitry. The converter circuitry may be configured according to a buck or a boost configuration switching between a zero and peak current levels. The pulse-pairing circuitry includes a paired pulse generator, a load detector, and a maximum on timing controller. In response to the low voltage signal, the paired pulse generator activates an on signal for a pair of equal duration on pulses separated by a predetermined pulse separation interval. The on time periods are based on an adjustable time value and a peak current indication. The load detector provides a load adjust signal for adjusting the time value based on sampling the low voltage signal and an off time signal at the start of the second pulse. The maximum on timing controller adjusts the adjustable time value based on the load adjust signal.

20 Claims, 7 Drawing Sheets

(56) References Cited

U.S. PATENT DOCUMENTS

| | | | | |
|---|---|---|---|---|
| 11,177,738 | B1* | 11/2021 | Pahkala | G04F 10/005 |
| 11,183,939 | B2* | 11/2021 | Bessegato | H02M 3/33592 |
| 2004/0095108 | A1* | 5/2004 | Kernahan | H03K 19/0963 |
| | | | | 323/282 |
| 2004/0095164 | A1* | 5/2004 | Kernahan | H03L 7/0996 |
| | | | | 327/94 |
| 2007/0216378 | A1* | 9/2007 | Ozawa | H02J 7/0068 |
| | | | | 323/252 |
| 2008/0116872 | A1* | 5/2008 | Nakazono | H02M 1/32 |
| | | | | 323/284 |
| 2012/0223687 | A1* | 9/2012 | Liu | H02M 3/1588 |
| | | | | 323/271 |
| 2020/0076305 | A1* | 3/2020 | Pizzotti | H02M 3/1582 |
| 2021/0184577 | A1* | 6/2021 | Yang | H02M 1/0003 |
| 2021/0313887 | A1* | 10/2021 | Mariani | H02M 3/158 |

FOREIGN PATENT DOCUMENTS

| | | | | | |
|---|---|---|---|---|---|
| CN | 111711361 | A | * | 9/2020 | |
| CN | 113241941 | A | * | 8/2021 | |
| EP | 2750276 | A1 | * | 7/2014 | H02M 3/156 |
| JP | 2021078312 | A | * | 5/2021 | |

* cited by examiner

SYSTEM AND METHOD OF AUTOMATIC CALIBRATION TO MAXIMIZE LOAD CURRENT SUPPORT OF DC-DC CONVERTER OPERATING IN PULSE-PAIRING MODE

BACKGROUND OF THE INVENTION

Field of the Invention

The present invention relates in general to DC-DC converters, and more particularly to a system and method of automatic calibration to maximize load current support of a DC-DC converter operating in pulse-pairing mode.

Description of the Related Art

A direct current (DC) to DC (DC-DC) converter switches current through an inductive element by switching between two voltage levels. A DC-DC buck converter, for example, converts a higher input voltage to a lower regulated output voltage level. The input voltage may be a battery voltage or a supply voltage or other source voltage. A DC-DC boost converter converts the input voltage to a regulated higher output voltage level. In either the buck or boost case, the switching activity generates high frequency noise causing electromagnetic interference (EMI) that may interfere with operation of surrounding circuitry. A wireless receiver, for example, maximizes its input gain sensitivity in order to detect weak wireless signals. EMI generated by a local switching power converter may interfere with receiver operation possibly preventing the receiver from detecting weak signals.

The DC-DC converter generates a series of arbitrary pulses, referred to herein as a pulse train, for regulating the output voltage. It has been discovered that the effect of pairing two arbitrary yet substantially identical pulses modifies the frequency spectrum of the generated noise to include frequency notches based on a time difference between the first and second paired pulses. The time difference between the pair of pulses in each cycle, otherwise referred to as a pulse separation interval, may be programmed using a clock signal having a selected frequency to align at least one frequency notch with the receiver frequency to reduce the impact of EMI on the DC-DC converter. The pairing of pulses in the pulse train of a DC-DC converter is referred to herein as pulse-pairing mode.

The notch frequency of a DC-DC converter operating in pulse-pairing mode may be adjusted at the radio frequency (RF) frequency band of the receiver to minimize the effect of EMI on the sensitivity of the receiver. The pulse separation interval between the paired pulses should be within a certain range to support the functionality of the DC-DC converter. Too short a time is not acceptable and too long a time is not acceptable to support the load current of the DC-DC converter. Thus, there is a trade-off between the maximum supported load current and the flexibility of choosing the pulse separation interval by limiting its value selection in a certain range. In addition, there is a need to ensure that the second pulse of the pulse pair starts from the same inductor current as the first pulse to ensure that they are symmetric pulses separated by the fixed pulse separation interval.

DC-DC converters in pulse pairing mode have generally exhibited lower load current support and higher voltage ripples at light load current. The reason for lower load current support is the conditions applied on the DC-DC converters to avoid merging the paired pulses. The reason for higher voltage ripples is that twice the charge is dumped in the output capacitor compared to normal operating mode of the DC-DC converter.

The operation of DC-DC converters is also negatively impacted when the input and output voltages are near each other. For example, as the battery voltage decreases towards the level of output voltage in battery-operated devices using a DC-DC buck converter, the on portion of each pulse may not achieve a predetermined peak current level. For a DC-DC boost converter, when the battery voltage is charged near the level of the output voltage, the off portion of each pulse may not reach zero inductor current and may even increase if the input voltage becomes greater than the output voltage. In either case, DC-DC converter operation may stall or even fail. It may be possible to limit the on pulse time to a maximum level for buck converters, or to limit the off pulse time for boost converters. These solutions, however, have proved ineffective for DC-DC converters operating in pulse-pairing mode. DC-DC buck converters operating in pulse-pairing mode, for example, generate insufficient load current at low input voltage. DC-DC boost converters operating in pulse-pairing mode simply failed when the input voltage was sufficiently close to the output voltage.

SUMMARY OF THE INVENTION

A DC-DC converter according to one embodiment includes DC-DC converter circuitry, a voltage detector, and pulse-pairing circuitry. The DC-DC converter circuitry switches current through an inductive element based on an on time signal between a zero current level and a peak current level to convert a source voltage to an output voltage. The voltage detector asserts a low voltage signal when the output voltage reaches a minimum voltage threshold. The pulse-pairing circuitry includes a paired pulse generator, a load detector, and a maximum on timing controller. The paired pulse generator activates, in response to assertion of the low voltage signal, the on signal for a first time period and then for a second time period in which the first and second time periods are separated by a predetermined pulse separation interval. The first time period has a duration based on an adjustable time value and a peak current indication and the second time period is the same as the first time period. The load detector receives the low voltage signal and an off signal indicative of an off time, and provides a load adjust signal having a first level when the off signal is detected asserted or the low voltage signal is detected de-asserted at a beginning of the second time period, while having a second level when the detected off signal is de-asserted and the detected low voltage signal is asserted at a beginning of the second time period. The maximum on timing controller adjusts the adjustable time value based on the load adjust signal.

The DC-DC converter circuitry may be configured according to a buck converter configuration or a boost converter configuration. In each case, the converter circuitry including first and second switches, an inductive element (e.g., an inductor), and drive control circuitry. The drive control circuitry provides a first drive signal to the control terminal of the first switch and that provides a second drive signal to the control terminal of the second switch. The inductive element is coupled between the switches and the output voltage for the buck converter and between the source voltage and the switches for the boost converter. The second drive signal is provided as the off signal to the load detector for the buck configuration, and the first drive signal is provided as the off signal to the load detector for the boost configuration. The voltage detector may include a comparator that compares the output voltage with a minimum threshold voltage to provide the low voltage signal.

The pulse separation interval is fixed between each pulse pair and based on a clock signal having a selected frequency to provide a target notch frequency in a frequency spectrum of a train of paired pulses. The paired pulse generator activates the on signal for a first pulse in response to assertion of the low voltage signal and deactivates the on signal after the first time period in response to a first occurrence of expiration of a time period indicated by the adjustable time value and a peak current indication, and then activates the on signal again after the pulse separation interval for a second pulse and deactivates the on signal after the second time period being the same as the first time period.

The load detector may include a first latch that samples the low voltage signal when the on signal is activated for the second pulse and that provides a sampled low voltage signal, a second latch that samples the off signal when the on signal is activated for the second pulse and that provides a sampled off signal, and a Boolean logic AND gate having a first input receiving the sampled low voltage signal, having a second input receiving the sampled off signal, and having an output providing the load adjust signal.

The maximum on time controller decreases the adjustable time value when the load adjust signal is at the first level and increases the adjustable time value when the load adjust signal is at the second level. The maximum on time controller may include a fixed-step digital accumulator, or may include a variable-step digital accumulator.

A method of operating a DC-DC converter in pulse-pairing mode according to one embodiment includes switching current through an inductive element based on an on time signal between a zero current level and a peak current level to convert a source voltage to an output voltage, asserting a low voltage signal when the output voltage reaches a minimum voltage threshold, activating, in response to assertion of the low voltage signal, the on signal for a first pulse until a peak current indication is received or upon expiration of an adjustable time period, activating the on signal for a second pulse for the same duration as for the first pulse after a fixed pulse separation interval from when the on signal is activated for the first pulse, when the on signal is asserted for the second pulse, asserting a load adjust signal at a first level when the zero current level is not reached or when the low voltage signal is not asserted, or asserting the load adjust signal at a second level when the zero current level is reached and the low voltage signal is asserted, and adjusting a duration of the adjustable time period based on the load adjust signal.

The method may include, for a buck converter configuration, coupling the inductive element between the source voltage and the output voltage when the on signal is active for the first and second pulses, and when the on signal becomes inactive for the first and second pulses, coupling the inductive element between a source reference voltage and the output voltage until the zero current level is reached.

The method may include, for a boost converter configuration, coupling the inductive element between the source voltage and a source reference node when the on signal is active for the first and second pulses, when the on signal becomes inactive for the first and second pulses, coupling the inductive element between the source voltage and the output voltage until the zero current level is reached. The method may include asserting a low voltage signal based on comparing the output voltage with a minimum threshold voltage.

The method may include using a clock signal and a fixed value to determine the fixed pulse separation interval to provide a target notch frequency in a frequency spectrum of a train of paired pulses. The method may include counting cycles of a clock signal using an adjustable value to determine the adjustable time period, and counting cycles of a clock signal using a fixed value to determine the fixed pulse separation interval.

The method may include sampling the low voltage signal when the on signal is activated for the second pulse and providing a sampled low voltage signal, providing an off signal indicative of an off time of the first and second pulses until current through the inductive element reaches the zero current level, sampling the off signal when the on signal is activated for the second pulse and providing a sampled off signal, and asserting the load adjust signal at the first level when the sampled off signal is asserted or when the sampled low voltage signal is de-asserted, and asserting the load adjust signal at the second level when the sampled off signal is de-asserted and the sampled low voltage signal is asserted.

The method may include decreasing the adjustable time value when the load adjust signal is at the first level and increasing the adjustable time value when the load adjust signal is at the second level. The method may include adjusting an adjustable value by fixed steps based on the load adjust signal and converting the adjustable value to the adjustable time value. The method may include adjusting an adjustable value by variable steps based on the load adjust signal and converting the adjustable value to the adjustable time value.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

The inventors have recognized the issues associated with operating DC-DC converters in pulse-pairing mode. They have therefore developed a system and method of automatic calibration to maximize load current support of DC-DC converters operating in pulse-pairing mode.

Figure 1:
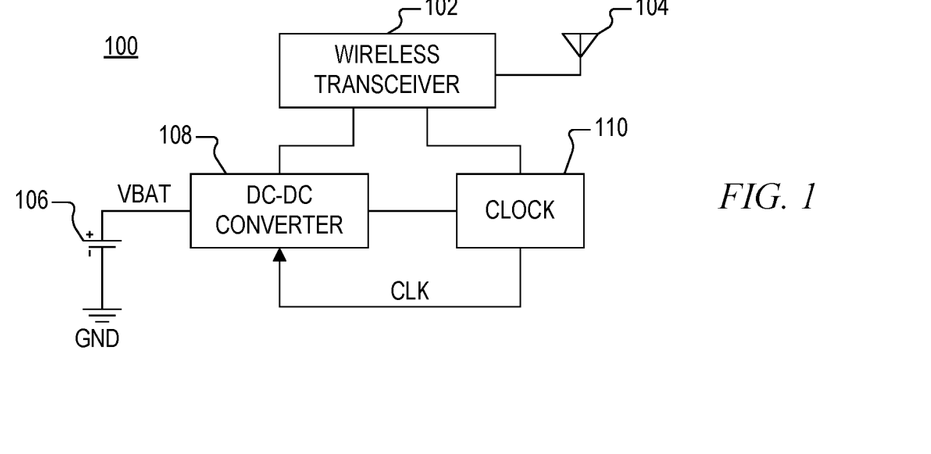
FIG. 1 is a simplified block diagram of a wireless device including a DC-DC converter implemented according to one embodiment of the present disclosure.

FIG. 1 is a simplified block diagram of a wireless device 100 including a DC-DC converter 108 implemented according to one embodiment of the present disclosure. The wireless device 100 includes wireless transceiver circuitry 102 for transmitting and receiving wireless communications (e.g., packets or frames) via an antenna 104. The wireless device 100 includes a battery 106 that provides a battery voltage VBAT to an input of the DC-DC converter 108, which converts VBAT to one or more supply voltages provided to the wireless transceiver circuitry 102 and to clock circuitry 110. The clock circuitry 110 generates one or more clock signals to the wireless transceiver circuitry 102. The clock circuitry 110 also provides a clock signal CLK to an input of the DC-DC converter 108 to facilitate pulse-pairing mode operation as further described herein.

Figure 2:
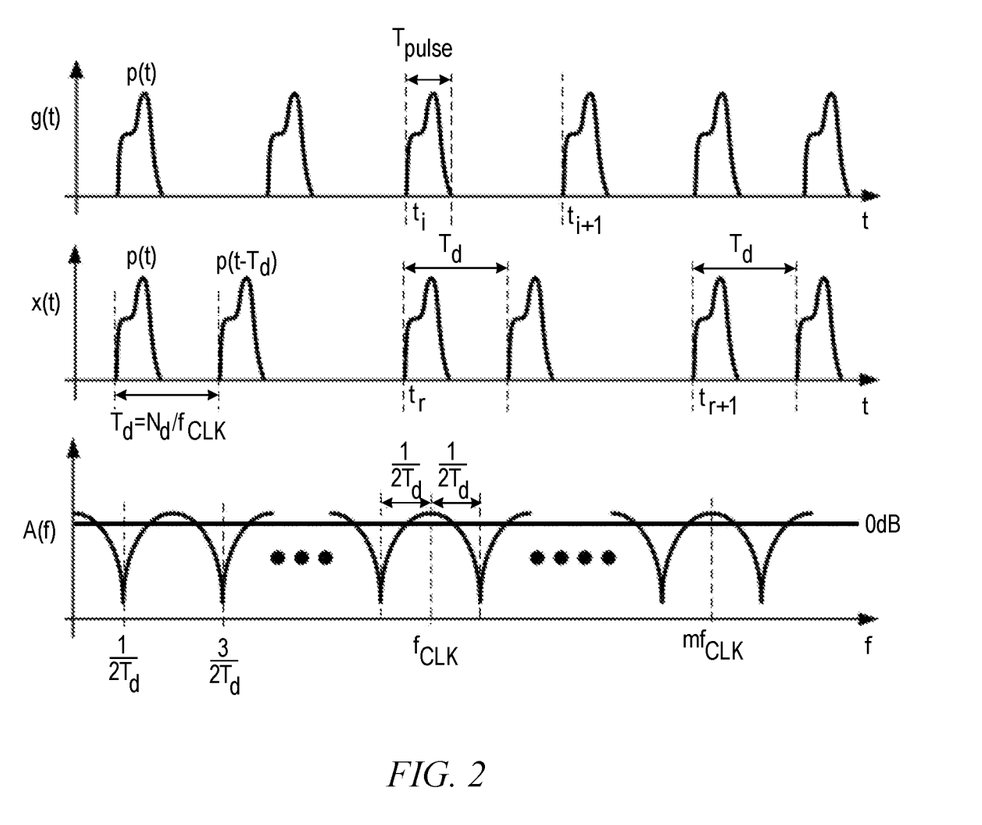
FIG. 2 shows a series of graphic diagrams illustrating pulse-based operation of the DC-DC converter of FIG. 1 according to various embodiments of the present disclosure.

FIG. 2 shows a series of graphic diagrams illustrating pulse-based operation of the DC-DC converter 108 according to various embodiments of the present disclosure. A first timing diagram plots a signal g(t) versus time (t), in which g(t) is a pulse-train of arbitrary pulses p(t) that may be generated by the DC-DC converter 108 when operating in a normal mode. The pulse timing separation, or $(t_{i+1}-t_i)$, from one pulse (e.g., a pulse at time $t_i$) to the next pulse (e.g., next pulse at time $t_{i+1}$) for the signal g(t) can be variable from pulse to the next. Although the pulses are shown substantially identical with each other, the shape of the pulses and the timing between the pulses may vary depending on load conditions. The timing width of each pulse is shown as $T_{pulse}$.

A second timing diagram plots a signal x(t) versus time (t), in which x(t) is also a pulse-train of arbitrary pulse-pairs p(t) and $p(t-T_d)$ that may be generated by the DC-DC converter 108 when operating in a pulse-pairing mode. Each of the paired pulses have a fixed delay between them, referred to herein as the pulse separation interval $T_d$. The pattern of paired pulses can occur at arbitrary times. As shown, for example, the time delay $(t_{r+1}-t_r)$ from a first pulse pair starting at a time $t_r$ to a second subsequent pulse pair starting at time $t_{r+1}$ can be variable. There are several conditions, however, that apply for pulse-pairing operation to maintain the applicable notch frequency. One condition is that the second pulse be substantially identical to the first pulse for each pulse-pair. Another condition is that the timing width of each pulse, or $T_{pulse}$, must not be greater than the pulse separation interval $T_d$ between each pair of pulses, or $T_{pulse} \leq T_d$. Another condition is that the pulse-pairs do not merge with each other, or a $(t_{r+1}-t_r) > (T_d + T_{pulse})$.

Frequency domain analysis may be used to analyze the effect of pulse pairing on the spectrum of the pulse train. Assuming $(t_{i+1}-t_i)$ and $(t_{r+1}-t_r)$ are varying randomly, the power spectral density ratio, or A(f), of power spectral density of x(t), or $(S_{xx}(f))$, to the power spectral density of g(t), or $(S_{gg}(f))$, is calculated according to the following equation (1):

$$A(f) = \frac{S_{xx}(f)}{S_{gg}(f)} = \frac{|X(f)|^2}{|G(f)|^2} = 2\cos^2(\pi f T_d) \tag{1}$$

where both signals g(t) and x(t) have the same spectral energy. A(f) is shown plotted in decibels (dB) versus frequency (f) in the third graph, which shows a conceptual figure for the formation of the notches in the spectrum of DC-DC noise for the DC-DC converter 108 operating in pulse-pairing mode. A plot of 0 dB is interposed with A(f) illustrating peaks rising above 0 dB with notches falling well below 0 dB. The frequencies that have notches in A(f) can be calculated according to the following equation (2):

$$\pi f_n T_d = n\pi - \frac{\pi}{2} = \left(n - \frac{1}{2}\right)\pi \rightarrow f_n = \left(n - \frac{1}{2}\right)\frac{1}{T_d} \tag{2}$$

where n is an integer number, where the notches are separated in frequency by $1/T_d$. Peak levels of A(f) occur at integer intervals of the frequency $f_{CLK}$ of the clock signal CLK (showing a peak at $f_{CLK}$ and another at $mf_{CLK}$ in which m is an integer). The quality of the notches on either side of $f_{CLK}$ is affected by the quality of the pulse separation interval $T_d$ between the pulses of each pulse pair. The frequency $f_{CLK}$ of CLK is used to ensure that $T_d$ is fixed for all paired pulses. As described further herein, a digital value $N_d$ may be used to count cycles of CLK to generate $T_d$, in which $T_d = N_d/f_{CLK}$.

Figure 3:
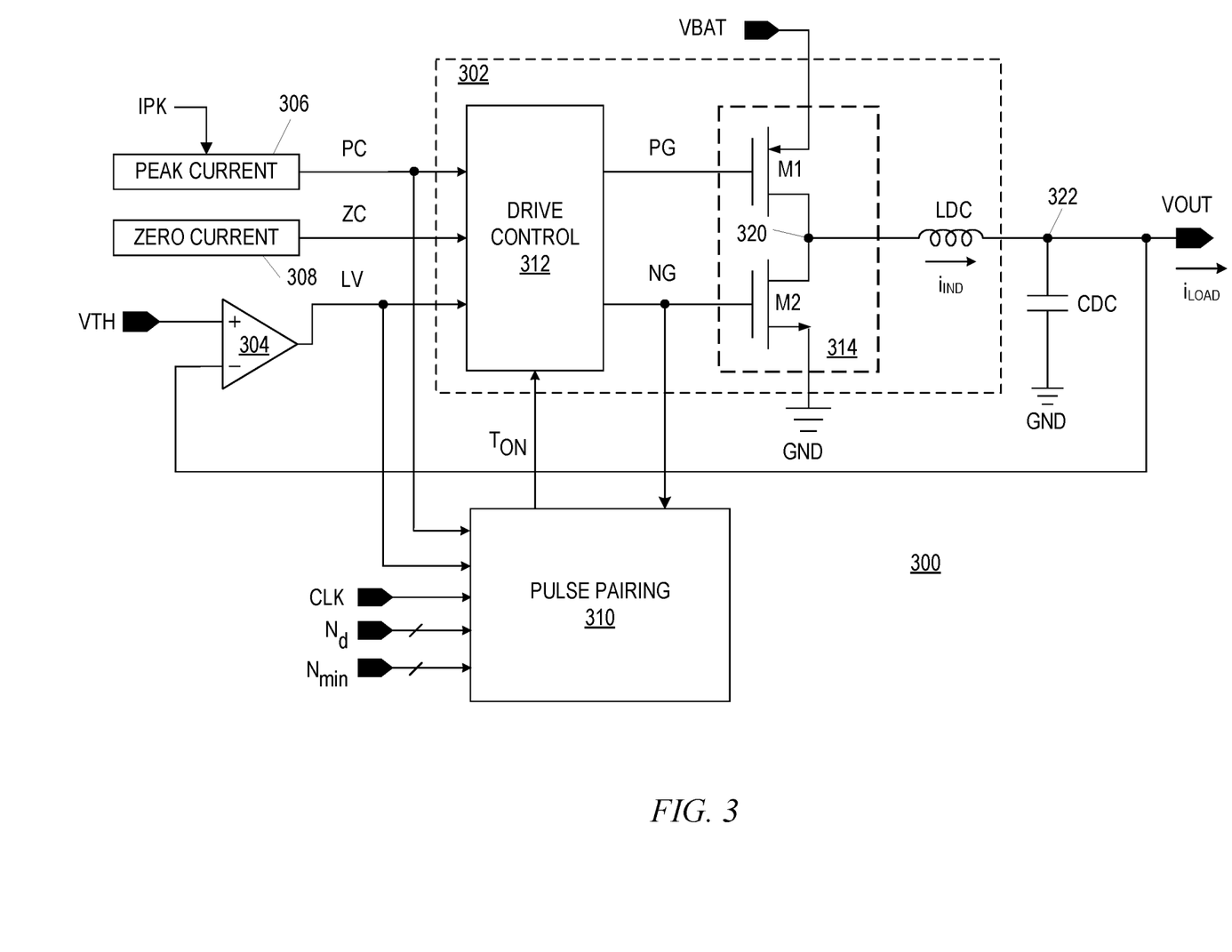
FIG. 3 is a simplified schematic and block diagram of a DC-DC buck converter implemented according to one embodiment of the present disclosure which may be used within (or as) the DC-DC converter of FIG. 1.

FIG. 3 is a simplified schematic and block diagram of a DC-DC buck converter 300 implemented according to one embodiment of the present disclosure which may be used within (or as) the DC-DC converter 108 of FIG. 1. The DC-DC buck converter 300 converts the battery voltage VBAT to a regulated, lower output voltage VOUT. The DC-DC buck converter 300 includes DC-DC converter circuitry 302, an output capacitor CDC, a comparator 304, a peak current detector 306, a zero current detector 308, and pulse pairing circuitry 310. The DC-DC converter circuitry 302 includes drive control circuitry 312, a tri-state driver 314, and an inductor LDC. The tri-state driver 314 includes a first electronic switch M1 and a second electronic switch M2. The switches M1 and M2 are depicted as MOS-type field-effect transistors (FETs), although alternative types of switches or transistors are contemplated for different embodiments. M1 is depicted as a P-type MOS transistor device and M2 is depicted as an N-type MOS transistor device, although alternative transistor configurations are contemplated.

The battery voltage VBAT is provided to the source terminal of M1, having its drain terminal coupled to the drain terminal of M2 at an intermediate node 320. The source terminal of M2 is coupled to a supply reference node, such as ground (GND). The intermediate node 320 is coupled to one end of the inductor LDC, having its other end coupled to an output node 322 developing an output voltage VOUT. The output capacitor CDC is coupled between the output node 322 and GND. Node 322 is coupled to a negative (or inverting) input of the comparator 304, having a positive (or non-inverting) input receiving a low threshold voltage VTH and having an output providing a low voltage signal LV. The zero current detector 308 senses when an inductor current $i_{IND}$ flowing through the inductor LDC goes to zero and asserts a zero current signal ZC indicative thereof (e.g., a zero current indication). The peak current detector 306 compares the inductor current $i_{IND}$ with a peak current level IPK and asserts a peak current signal PC indicative thereof (e.g., a peak current indication). The LV, ZC, and PC signals are provided to respective inputs of the drive control circuitry 312, which outputs a positive drive signal PG to the gate terminal of M1 and a negative drive signal NG to the gate terminal of M2.

The PC, LV, and NG signals are provided to respective inputs of the pulse pairing circuitry 310, having an output providing a timing signal $T_{ON}$ to an input of the drive control circuitry 312. The pulse pairing circuitry 310 receives the clock signal CLK and digital values $N_d$ and $N_{min}$. $N_d$ is used to determine the pulse separation interval $T_d$, in which $T_d=N_d/f_{CLK}$, and $N_{min}$ is used to determine a minimum on time duration $T_{min}$ for each pulse, in which $T_{min}=N_{min}/f_{CLK}$.

When the DC-DC buck converter 300 is used within (or as) the DC-DC converter 108 of the wireless device 100, it is operated in a normal mode when the wireless device 100 is not in a receive mode of operation in which case the pulse pairing circuitry 310 is disabled. VOUT is coupled to one or more loads (e.g., in the wireless transceiver 102 and/or the clock circuitry 110 and/or other circuitry not shown) which draw a load current $i_{LOAD}$ from the output capacitor CDC causing the voltage level of VOUT to decrease. When VOUT decreases to the level of VTH, the comparator 304 asserts the low voltage signal LV. The drive control circuitry 312 detects LV asserted high and asserts PG low turning on M1 to couple VBAT to the inductor LDC via the intermediate node 320. NG remains de-asserted low during the "ON" or charge cycle to prevent VBAT from being coupled to GND. Assuming VBAT>VOUT, the inductor current $i_{IND}$ increases to charge the capacitor CDC and increase the voltage level of VOUT.

When the inductor current $i_{IND}$ reaches the level of IPK, the peak current detector 306 asserts PC high. When PC is asserted high, the drive control circuitry 312 de-asserts PG high turning off M1 and then asserts NG high turning on M2 to couple the inductor LDC to GND via the intermediate node 320. PG remains de-asserted high during an "OFF" or discharge cycle to prevent VBAT from being coupled to GND. Since VOUT>GND, the inductor current $i_{IND}$ decreases to reduce the inductor current $i_{IND}$ back to zero. When the inductor current $i_{IND}$ goes to 0 (zero), the zero current detector 308 asserts ZC high and the drive control circuitry 312 de-asserts NG low turning off M2. The OFF time is referred to as $T_{OFF}$, and the total pulse time $T_{pulse}=T_{ON}+T_{OFF}$. M1 and M2 may remain off until the voltage level VOUT falls back to VTH, beginning the next cycle. Operation repeats in the manner developing the train of pulses similar to g(t) shown in FIG. 2.

When the wireless device 100 switches into the receive mode of operation for detecting wireless signals transmitted by other wireless devices, the pulse pairing circuitry 310 is enabled to switch the DC-DC buck converter 300 into a pulse-pairing mode of operation. When in the pulse-pairing mode of operation, the drive control circuitry 312 ignores LV and instead monitors the $T_{ON}$ signal for controlling switching operation of the tri-state driver 314. When $T_{ON}$ is asserted high, the drive control circuitry 312 asserts PG low to begin the next ON or charge cycle. When $T_{ON}$ is next de-asserted low, the drive control circuitry 312 de-asserts PG high and asserts NG high to begin the following OFF or discharge cycle. When ZC is next asserted high, the drive control circuitry 312 de-asserts NG low to complete the current pulse cycle. For the pulse-pairing mode of operation, the time of each pulse is $T_{pulse1}=T_{ON1}+T_{OFF1}$ and $T_{pulse2}=T_{ON2}+T_{OFF2}$. As described further herein, the pulse pairing circuitry 310 ensures that $T_{ON1}=T_{ON2}$, and since substantially the same voltage and current conditions exist at the end of each pulse pair, $T_{OFF1}\approx T_{OFF2}$ so that the pulses of the pulse-pair are substantially the same.

If for any reason $T_{ON}$ is again asserted high before ZC is asserted (and while NG may still be asserted), the drive control circuitry 312 immediately de-asserts NG and re-asserts PG to begin the next pulse cycle even if the prior pulse cycle was not yet completed. It is noted that the comparator 304 is reset during the pulse time $T_{pulse}$ during the normal mode and during both $T_{pulse1}$ and $T_{pulse2}$ during the pulse-pairing mode. In this manner, LV may only be asserted high to indicate the low voltage condition between pulses rather than during any pulse. Thus, $T_{ON}$ may only be asserted high before the completion of the first pulse when the time of the first pulse, or $T_{pulse1}$, exceeds the pulse separation interval $T_d$. The pulse pairing circuitry 310 automatically adjusts to calibrate the pulse-pair to avoid pulse merging in future cycles. Pulse merging may be tolerated for a few cycles without substantially impacting successful operation.

As described further herein, the pulse pairing circuitry 310 asserts $T_{ON}$ high for two identical ON time periods separated in time by the pulse separation interval $T_d$ for each pulse cycle according to pulse-pairing mode of operation. The pulse pairing circuitry 310 performs automatic calibration to maximize load current support to determine the duration of each pulse of the pair, in which the ON time has a minimum duration calculated as $N_{min}/f_{CLK}$. The pulse separation interval $T_d$ is fixed and calculated as $N_d/f_{CLK}$.

Figure 4:
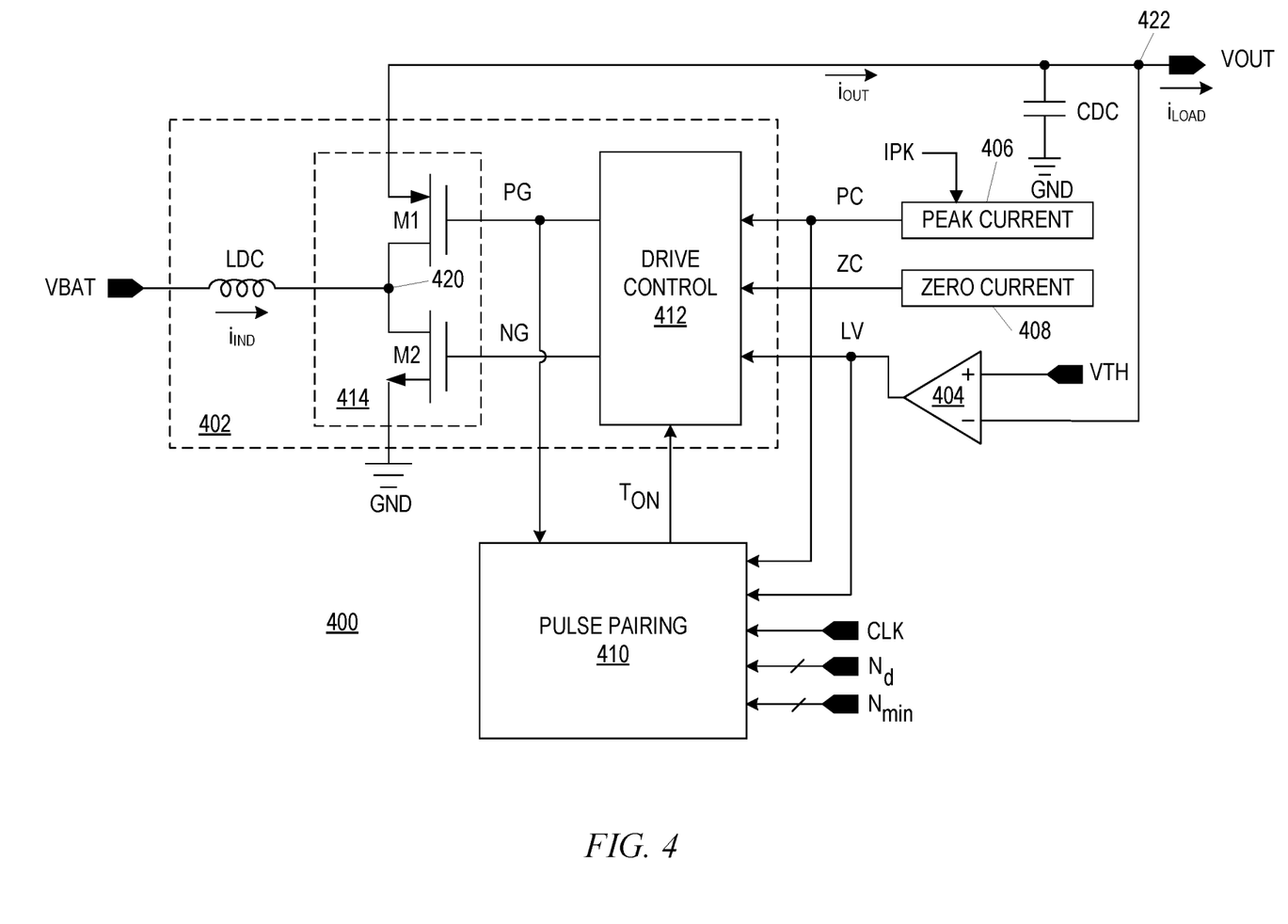
FIG. 4 is a simplified schematic and block diagram of a DC-DC boost converter implemented according to one embodiment of the present disclosure which may be used within (or as) the DC-DC converter of FIG. 1.

FIG. 4 is a simplified schematic and block diagram of a DC-DC boost converter 400 implemented according to one embodiment of the present disclosure which may be used within (or as) the DC-DC converter 108 of FIG. 1. The DC-DC boost converter 400 converts the battery voltage VBAT to a regulated, higher output voltage VOUT. The DC-DC boost converter 400 includes DC-DC converter circuitry 402, an output capacitor CDC, a comparator 404, a peak current detector 406, a zero current detector 408, and pulse pairing circuitry 410. The DC-DC converter circuitry 402 includes drive control circuitry 412, a tri-state driver 414, and an inductor LDC. The tri-state driver 414 includes a first electronic switch M1 and a second electronic switch M2 similar to the DC-DC buck converter 300. Again, M1 is depicted as a P-type MOS transistor device and M2 is depicted as an N-type MOS transistor device, although alternative transistor configurations are contemplated.

In the DC-DC boost converter case, an output node 422 developing the output voltage VOUT is coupled to the source terminal of M1, having its drain terminal coupled to the drain terminal of M2 at an intermediate node 420. The source terminal of M2 is coupled to supply reference node GND. The intermediate node 420 is coupled to one end of the inductor LDC, having its other end receiving the battery voltage VBAT. The output capacitor CDC is coupled between the output node 422 and GND. The output node 422 is also coupled to a negative (or inverting) input of the comparator 404, having a positive (or non-inverting) input receiving a low threshold voltage VTH and having an output providing a low voltage signal LV. The zero current detector 408 senses when an inductor current $i_{IND}$ flowing through the inductor LDC goes to zero and asserts a zero current signal ZC indicative thereof. The peak current detector 406 senses and compares the inductor current $i_{IND}$ with a peak current value IPK and asserts a peak current signal PC indicative thereof. The LV, ZC, and PC signals are provided to respective inputs of the drive control circuitry 412, which outputs a positive drive signal PG to the gate terminal of M1 and a negative drive signal NG to the gate terminal of M2.

The PC, LV, and PG signals are provided to respective inputs of the pulse pairing circuitry 410, having an output providing a timing signal $T_{ON}$ to an input of the drive control circuitry 412. The pulse pairing circuitry 410 receives the clock signal CLK and digital values $N_d$ and $N_{min}$. $N_d$ is used to determine the pulse separation interval $T_d$, in which $T_d=N_d/f_{CLK}$, and $N_{min}$ is used to determine a minimum on time duration $T_{min}$ for each pulse as further described herein, in which $T_{min}=N_{min}/f_{CLK}$. It is noted that the pulse pairing circuitry 410 of the DC-DC boost converter 400 may be configured in substantially the same manner to operate in substantially the same manner as the pulse pairing circuitry 310 of the DC-DC buck converter 300.

When the DC-DC boost converter 400 is used within (or as) the DC-DC converter 108 of the wireless device 100, it is operated in a normal mode when the wireless device 100 is not in a receive mode of operation in which case the pulse pairing circuitry 410 is disabled. VOUT is coupled to one or more loads (e.g., in the wireless transceiver 102 and/or the clock circuitry 110 and/or other circuitry not shown) which draw load current $i_{LOAD}$ from the output capacitor CDC causing the voltage level of VOUT to decrease. When VOUT decreases to the level of VTH, the comparator 404 asserts the low voltage signal LV. The drive control circuitry 412 detects LV asserted high and asserts NG high turning on M2 to couple VBAT to the inductor LDC via the intermediate node 420. PG remains de-asserted high during the ON or charge cycle to prevent VOUT from being coupled to GND. Assuming VBAT>GND, the inductor current $i_{IND}$ increases.

When the inductor current $i_{IND}$ reaches the level of IPK, the peak current detector 406 asserts PC high. When PC is asserted high, the drive control circuitry 412 de-asserts NG low turning off M2 and then asserts PG low turning on M1 to couple the inductor LDC to VOUT via the intermediate node 420. NG remains de-asserted low during the OFF time or discharge cycle to prevent VOUT from being coupled to GND. Since VOUT>VBAT, the inductor current $i_{IND}$ decreases to reduce the inductor current $i_{IND}$ back to zero. When the inductor current $i_{IND}$ reaches zero, the zero current detector 408 asserts ZC high and the drive control circuitry 412 de-asserts PG high turning off M1. Again, the OFF time is referred to as $T_{OFF}$, and the total pulse time $T_{pulse}=T_{ON}+T_{OFF}$. M1 and M2 may remain off until the voltage level VOUT falls back to VTH, beginning the next cycle. Operation repeats in the manner developing the train of pulses similar to g(t) shown in FIG. 2.

When the wireless device 100 switches into the receive mode of operation for detecting wireless signals transmitted by other wireless devices, the pulse pairing circuitry 410 is enabled to switch the DC-DC boost converter 400 into a pulse-pairing mode of operation. When in the pulse-pairing mode of operation, the drive control circuitry 412 ignores LV and instead monitors the $T_{ON}$ signal for controlling switching operation of the tri-state driver 414. When $T_{ON}$ is asserted high, the drive control circuitry 412 asserts NG high to begin the next ON or charge cycle. When $T_{ON}$ is next de-asserted low, the drive control circuitry 412 de-asserts NG low and asserts PG low to begin the following OFF or discharge cycle. When ZC is next asserted high, the drive control circuitry 412 de-asserts PG high to complete the current pulse cycle. Again, for the pulse-pairing mode of operation, the time of each pulse is $T_{pulse1}=T_{ON1}+T_{OFF1}$ and $T_{pulse2}=T_{ON2}+T_{OFF2}$. Also, the pulse pairing circuitry 410 ensures that $T_{ON1}=T_{ON2}$, and since substantially the same voltage and current conditions exist at the end of each pulse pair, $T_{OFF1} \approx T_{OFF2}$ so that the pulses of the pulse-pair are substantially the same.

If for any reason $T_{ON}$ is again asserted high before ZC is asserted (and while PG may still be asserted), the drive control circuitry 412 immediately de-asserts PG and re-asserts NG to begin the next pulse cycle even of the prior pulse cycle was not yet completed. As for the comparator 304, the comparator 404 is reset during the pulse time $T_{pulse}$ during the normal mode and during both $T_{pulse1}$ and $T_{pulse2}$ during the pulse-pairing mode. In this manner, LV may only be asserted high to indicate the low voltage condition between pulses rather than during any pulse. Thus, $T_{ON}$ may only be asserted high before the completion of the first pulse when the time of the first pulse, or $T_{pulse1}$, exceeds the pulse separation interval $T_d$. The pulse pairing circuitry 410 automatically adjusts to calibrate the pulse-pair to avoid pulse merging in future cycles. Pulse merging may be tolerated for a few cycles without substantially impacting successful operation.

The pulse pairing circuitry 410 operates in substantially identical manner as the pulse pairing circuitry 310, in which it asserts $T_{ON}$ high for two identical ON time periods separated in time by pulse separation interval $T_d$ for each pulse cycle according to pulse-pairing mode of operation. The pulse pairing circuitry 410 performs automatic calibration to maximize load current support to determine the duration each pulse of the pair, in which the ON time has a minimum duration calculated as $N_{min}/f_{CLK}$. The pulse separation interval $T_d$ is fixed and calculated as $N_d/f_{CLK}$.

Figure 5:
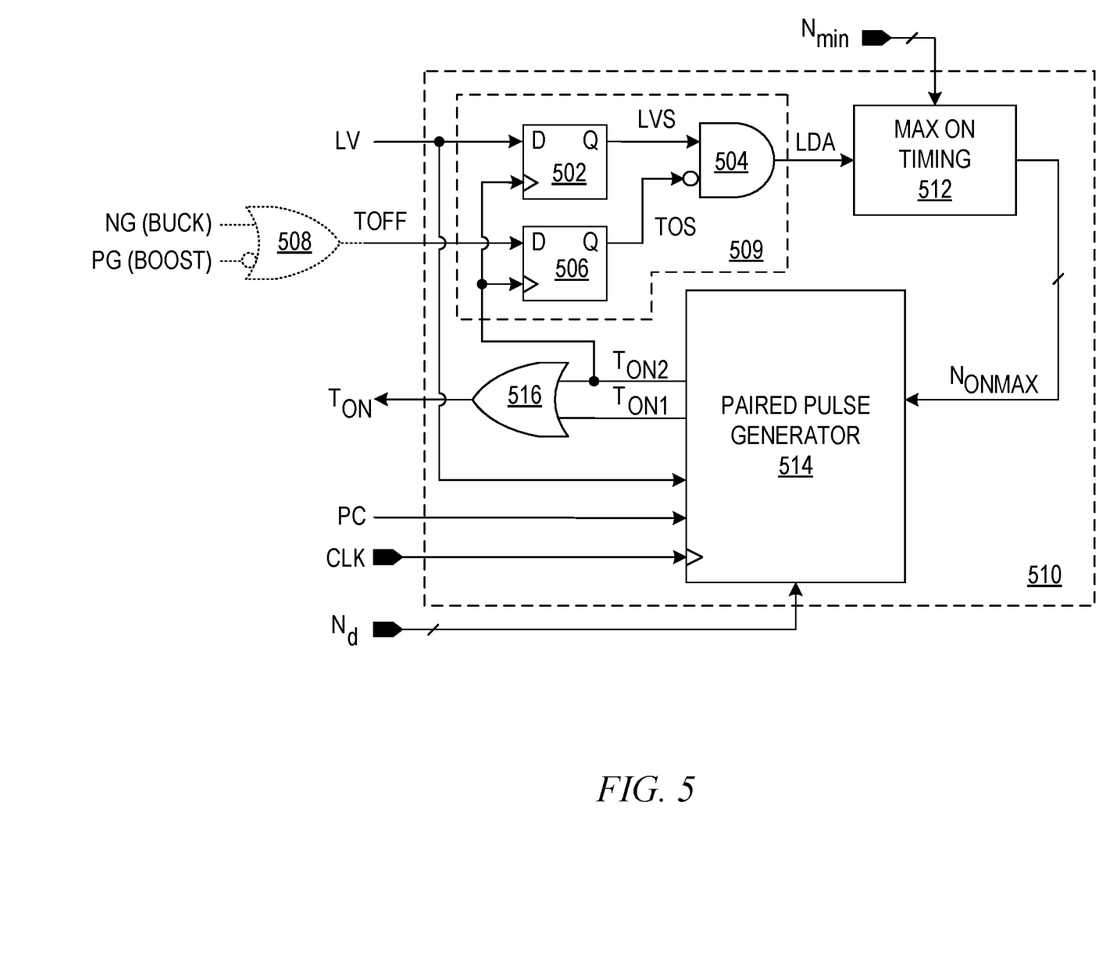
FIG. 5 is a simplified schematic and block diagram of pulse pairing circuitry implemented according to one embodiment of the present disclosure which may be used as either the pulse pairing circuitry of the DC-DC buck converter of FIG. 3 or the pulse pairing circuitry of the DC-DC boost converter of FIG. 4.

FIG. 5 is a simplified schematic and block diagram of pulse pairing circuitry 510 implemented according to one embodiment of the present disclosure which may be used as either the pulse pairing circuitry 310 of the DC-DC buck converter 300 or the pulse pairing circuitry 410 of the DC-DC boost converter 400. The LV signal is provided to the D input of a D-type flip-flop (DFF) 502, having its non-inverting Q output providing a sampled version of LV, or LVS, to one input of a 2-input Boolean logic AND gate 504. A signal $T_{OFF}$ is provided to the D input of another DFF 506, having its non-inverting Q output providing a sampled version of $T_{OFF}$, or TOS, to the other input of the AND gate 504, which is shown as an inverted input. The DFFs 502 and 504 and the AND gate 504 form a load detector 509 providing a load adjust signal LDA at the output of the AND gate 504. $T_{OFF}$ is shown provided by a 2-input Boolean logic OR gate 508 depicted using dotted lines, receiving NG at one non-inverting input and PG at an inverting input. The OR gate 508 represents that $T_{OFF}$ is provided as the NG signal for the DC-DC buck converter 300 or as an inverted version of the PG signal for the DC-DC boost converter 400. TOFF is asserted during the OFF time $T_{OFF1}$ or $T_{OFF2}$ of each pulse of the pulse-pair.

The LDA signal is provided to an input of a maximum (MAX) ON timing controller 512, having another input receiving $N_{min}$ and having an output providing a digital value $N_{ONMAX}$ to an input of a paired pulse generator 514. The paired pulse generator 514 has respective inputs receiving the LV and PC signals, a digital input receiving the $N_d$ value, and a clock input receiving the CLK signal. The paired pulse generator 514 has a pair of outputs providing a first ON signal $T_{ON1}$ and a second ON signal $T_{ON2}$. $T_{ON1}$ and $T_{ON2}$ are provided to respective inputs of a 2-input Boolean OR gate 516, having an output providing the $T_{ON}$ signal as an output of the pulse pairing circuitry 510. $T_{ON2}$ is provided to the clock inputs of the DFFs 502 and 506.

Operation of the pulse pairing circuitry 510 is as follows. When LV is asserted high indicating that the voltage level of VOUT has decreased to the low voltage threshold VTH. The paired pulse generator 514 asserts $T_{ON1}$ high to begin the ON portion of first pulse of the pulse pair, in which the OR gate 516 correspondingly asserts $T_{ON}$ high. As previously described, for the DC-DC buck converter 300 operating in the pulse-pairing mode, when $T_{ON}$ goes high the drive control circuitry 312 asserts PG low, and for the DC-DC boost converter 400 operating in the pulse-pairing mode, when $T_{ON}$ goes high the drive control circuitry 412 asserts NG high. The paired pulse generator 514 keeps $T_{ON1}$ high for a maximum ON time of $T_{ONMAX}=N_{ONMAX}/f_{CLK}$ or until PC is asserted indicating that the inductor current $i_{IND}$ has reached IPK, whichever occurs first. After expiration of the pulse separation interval $T_d=N_d/f_{CLK}$ from when LV was asserted, the paired pulse generator 514 asserts $T_{ON2}$ high to begin the ON portion of second pulse of the pulse pair. The paired pulse generator 514 keeps $T_{ON2}$ high for the second pulse for the same duration that $T_{ON1}$ was asserted high for the first pulse of each pulse pair regardless of the state of PC.

When $T_{ON2}$ is asserted high to start the second pulse of the pulse-pair, the DFF 502 samples LV as LVS and the DFF 506 samples TOFF as TOS. The AND gate 504 asserts LDA high when LVS is high and TOS is low, but otherwise asserts LDA low. The MAX ON timing controller 512 increases $N_{ONMAX}$ when LDA is high to increase $T_{ONMAX}$, and decreases $N_{ONMAX}$ when LDA is low to decrease $T_{ONMAX}$. It is noted that if LV is high when $T_{ON2}$ is asserted high so that LVS is asserted high, then VOUT has become low between the pulse pair possibly indicating a high load current. In this case, LVS indicates a request to increase $T_{ONMAX}$. Even so, if TOFF is high when $T_{ON2}$ is asserted high so that TOS is asserted high, then the inductor current $i_{IND}$ has not yet reached zero so that the first pulse is not completed when the second pulse of the pulse pair is activated meaning the pulses are merged. As previously described, this may occur if the time of the first pulse $t_{pulse1}$ exceeds the pulse separation interval $T_d$, which may occur when $N_{ONMAX}$ has been adjusted too high. This pulse-merging condition is a violation of pulse-pairing mode of operation, in which TOS asserted high indicates a request to decrease $T_{ONMAX}$ to prevent or otherwise minimize pulse-merging.

In summary, the MAX ON timing controller 512 decreases $N_{ONMAX}$ when LDA is low and increases $N_{ONMAX}$ when LDA is high. When TOS is low, LDA is asserted low when LVS is low indicating a lower load condition causing the MAX ON timing controller 512 to decrease $N_{ONMAX}$. Also while TOS is low, LDA is asserted high when LVS is high indicating a higher load condition causing the MAX ON timing controller 512 to increase $N_{ONMAX}$. LDA is low when TOS is high indicating pulse-merging which is a violation of the pulse-pairing mode of operation, so that the MAX ON timing controller 512 decreases $N_{ONMAX}$ accordingly to reduce or eliminate pulse merging. Although pulse-merging is a violation of the pulse-pairing mode of operation, it may be tolerated for a few cycles.

As previously noted, the MAX ON timing controller 512 increases $N_{ONMAX}$ thereby increasing $T_{ONMAX}$ when LDA is high, and otherwise decreases $N_{ONMAX}$ thereby decreasing $T_{ONMAX}$ when LDA is low. At light load current, the MAX ON timing controller 512 prevents $N_{ONMAX}$ from falling below a minimum value determined by $N_{min}$ even when LDA is low, in which case the $T_{ONMAX}$ time is set to a minimum value of $T_{min}=N_{min}/f_{CLK}$. At maximum load current, $T_{ONMAX}$ is set to maximum value that does not cause pulse-merging.

In one embodiment, the MAX ON timing controller 512 is implemented as a digital accumulator that constantly adjusts the digital value of $N_{ONMAX}$ up or down (with a minimum of $N_{min}$) implementing automatic calibration to maximum load current support of either DC-DC converter operating in pulse-pairing mode. The accumulator may be implemented as a simple, single-step digital integrator in which the digital step is the same incremental value when increasing or decreasing.

In an alternative embodiment to speed up the calibration control loop for faster response to load changes, the accumulator is implemented as a variable-step digital integrator in which the digital step is increased in successive steps when changing $N_{ONMAX}$ in the same direction. For example, if S is a unitary digital value of a minimum incremental step, then when LDA remains the same value in successive steps, the step value may exponentially increase, such as S, 2S, 4S, etc., in either the up (increasing) or down (decreasing) direction. Thus, if LDA changes from 0 (low) to 1 (high), then $N_{ONMAX}$ is increased by the minimum step value S in the first iteration. If LDA remains 1 in the following successive iterations, then $N_{ONMAX}$ is increased by 2S in the second iteration, and then by 4S in the third iteration, and so on. And when LDA changes from 1 to 0 and stays 0 in successive iterations, then $N_{ONMAX}$ is decreased by S in the first iteration, then by 2S in the second iteration, then by 4S in the third iteration, and so on.

In another embodiment of the variable-step digital integrator, the maximum step size may be limited to a predetermined step size. For example, the maximum step size may be selected as 4S in either up or down directions. In yet another embodiment of the variable-step digital integrator, the maximum step size may be different depending upon whether $N_{ONMAX}$ is increasing or decreasing. For example, the maximum increasing step size may be 16S (e.g., S, 2S, 4S, 8S, 16S), and the maximum decreasing step size may be 4S (e.g., S, 2S, 4S). In yet other embodiments, the changes in step size may be linear (e.g., S, 2S, 3S, 4S, etc.) rather than exponential and have a maximum step size that is the same or different in both directions.

Figure 6:
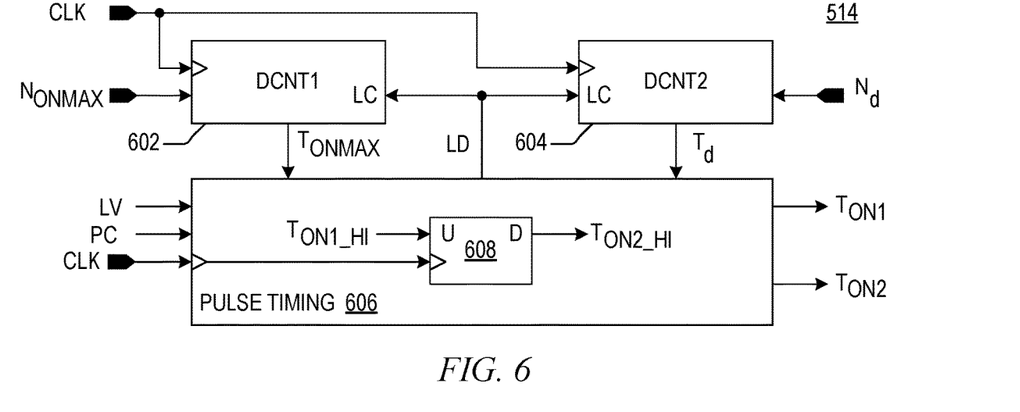
FIG. 6 is a simplified block diagram showing further details of the paired pulse generator of FIG. 5 implemented according to one embodiment of the present disclosure.

FIG. 6 is a simplified block diagram showing further details of the paired pulse generator 514 implemented according to one embodiment of the present disclosure. The paired pulse generator 514 may include a first down counter (DCNT1) 602, a second down counter (DCNT2) 604, and pulse timing circuitry 606. The pulse timing circuitry 606 may include an up/down counter 608 or the like that may include one or more separate counters. The pulse timing circuitry 606, the up/down counter 608 and each of the down counters 602 and 604 have a clock input receiving the CLK signal. The down counters 602 and 604 each include a load control (LC) input receiving a load signal LD, and a load input for receiving a digital value. The first down counter 602 has a load input receiving $N_{ONMAX}$, and the second down counter 604 has a load input receiving $N_d$. The pulse timing circuitry 606 has respective inputs receiving the LV and PC signals and respective outputs providing the $T_{ON1}$ and $T_{ON2}$ signals.

In operation of the paired pulse generator 514 shown in FIG. 6, when LV is asserted at the beginning of a new pulse-pair cycle, the pulse timing circuitry 606 pulses LD and asserts $T_{ON1}$. In response to LD, the first down counter 602 loads the digital value $N_{ONMAX}$, the second down counter 604 loads the digital value $N_d$, and both counters begin counting down from their respective loaded values with subsequent assertions of CLK. When the first down counter 602 times out, it asserts a signal $T_{ONMAX}$ to the pulse timing circuitry 606, representing the maximum ON time duration of each of the pulses of the pulse-pair, essentially performing the timing function of $T_{ONMAX}=N_{ONMAX}/f_{CLK}$ (or $N_{ONMAX}$ multiplied by the period of CLK). In response to assertion of either $T_{ONMAX}$ or PC, whichever occurs first, the pulse timing circuitry 606 de-asserts $T_{ON1}$ to terminate the ON time of the first pulse.

When the second down counter 604 times out, it asserts a signal $T_d$ to the pulse timing circuitry 606, representing the pulse separation interval $T_d$ between the pulses of the pulse-pair, essentially performing the timing function of $T_d=N_d/f_{CLK}$ (or $N_d$ multiplied by the period of CLK). In response to assertion of $T_d$, the pulse timing circuitry 606 asserts $T_{ON2}$ to begin the ON time of the second pulse of the pulse-pair. The pulse timing circuitry 606 forces the ON time duration of the second pulse to be the same as the first pulse, such as using a counted timing value stored in the up/down counter 608 as further described herein. When the ON time duration of the second pulse is completed, the pulse timing circuitry 606 de-asserts $T_{ON2}$ to complete the pulse-pair cycle.

In one embodiment, the up/down counter 608 receives and counts the total number of CLK cycles while $T_{ON1}$ is asserted high, shown as $T_{ON1\_HI}$, to essentially measure the actual ON time duration of the first pulse on $T_{ON1}$. As shown, $T_{ON1\_HI}$ is provided to an up (U) input representing that the up/down counter 608 counts up from zero to count the number of cycles of CLK while $T_{ON1}$ is high. This ON timing of the first pulse on $T_{ON1}$ may then be used to control the ON time duration of the second pulse on $T_{ON2}$ of the pulse-pair, shown as $T_{ON2\_HI}$. As shown, $T_{ON2\_HI}$ is provided from a down (D) output representing that the up/down counter 608 counts down from when $T_{ON2}$ is first asserted, in which the pulse on $T_{ON2}$ is completed when the up/down counter 608 times out which occurs when $T_{ON2\_HI}$ is decremented down to zero.

It is noted that operation of the on timing circuitry 512 ensures that $T_{ONMAX}$ is asserted before $T_d$, although $T_d$ can be asserted before completion of the off time $T_{OFF1}$ of the first pulse causing the second pulse to be merged with the first. The on timing circuitry 512 correspondingly reduces $T_{ONMAX}$ to eliminate pulse merging in subsequent cycles.

Figure 7:
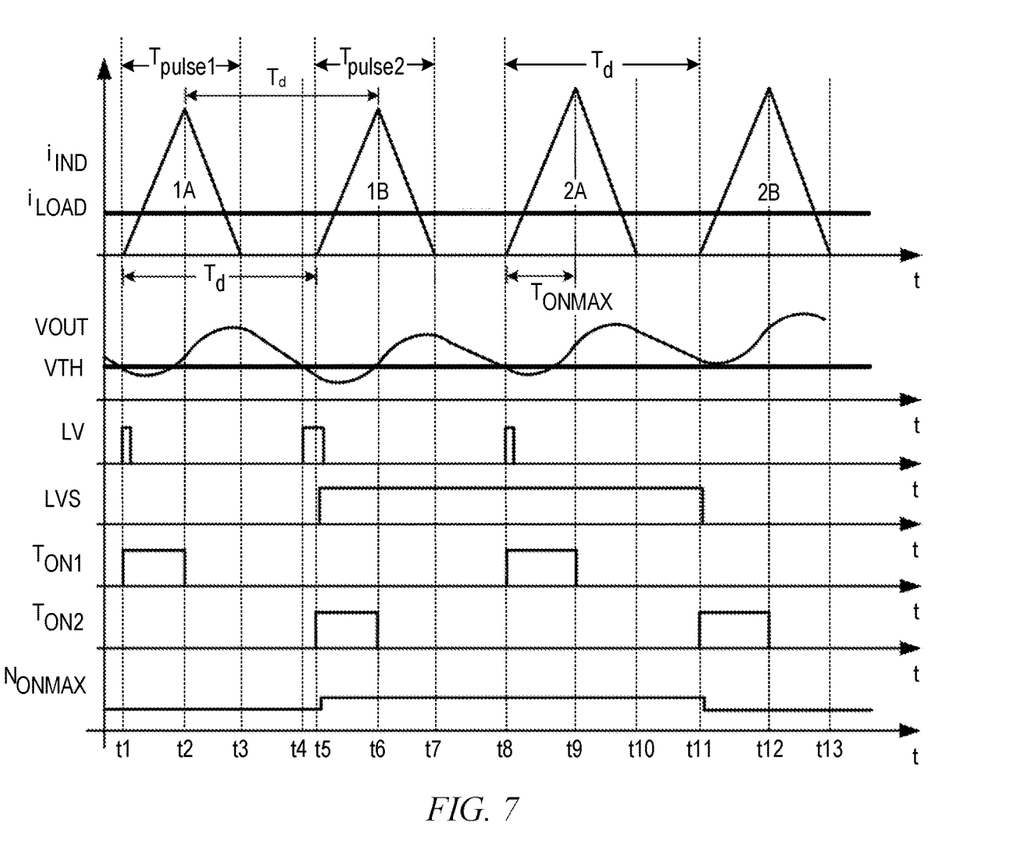
FIG. 7 is a timing diagram illustrating operation of the DC-DC buck converter of FIG. 3 in the pulse-pairing mode using the pulse pairing circuitry of FIG. 5 according to one embodiment of the present disclosure.

FIG. 7 is a timing diagram illustrating operation of the DC-DC buck converter 300 in the pulse-pairing mode using the pulse pairing circuitry 510 according to one embodiment of the present disclosure. The signals $i_{IND}$, $i_{LOAD}$, VOUT, VTH, LV, LVS, $T_{ON1}$, $T_{ON2}$ and $N_{ONMAX}$ are plotted versus time (t). The load current $i_{LOAD}$ is plotted with $i_{IND}$ and shown in simplified form as a nonvarying load line. The low voltage threshold VTH is plotted with VOUT. At a first time t1 VOUT falls to VTH so that the comparator 304 asserts LV high. The paired pulse generator 514 asserts $T_{ON1}$ high (causing $T_{ON}$ to be asserted high) so that the drive control circuitry 312 turns on M1 causing $i_{IND}$ to increase initiating a first pulse 1A. The comparator 304 is then reset so that LV is asserted back low for the remainder of pulse 1A. At subsequent time t2, the paired pulse generator 514 asserts $T_{ON1}$ low (causing $T_{ON}$ to be asserted low) so that the drive control circuitry 312 turns M1 off and turns M2 on causing $i_{IND}$ to decrease to complete the first pulse 1A at subsequent time t3. Although not shown, the OFF time $T_{OFF1}$ of the first pulse 1A occurs between times t2 and t3, during which time TOFF is asserted.

VOUT falls below VTH at subsequent time t4. If the DC-DC buck converter 300 were operating in the normal mode, this would cause the drive control circuitry 312 to initiate the next pulse. In the pulse-pairing mode, however, the drive control circuitry 312 ignores LV and waits for $T_{ON}$ to be asserted again. At subsequent time t5, the paired pulse generator 514 asserts $T_{ON2}$ high (causing $T_{ON}$ to be asserted high again) so that the drive control circuitry 312 turns on M1 causing $i_{IND}$ to increase initiating the second pulse 1B of the pulse-pair. Since LV is still asserted high when $T_{ON2}$ is asserted, the DFF 502 latches LVS high. Since TOFF is low when $T_{ON2}$ is asserted high at time t5, the AND gate 504 asserts LDA high so that the on timing circuitry 512 increases $N_{ONMAX}$. Although $N_{ONMAX}$ has been increased, the paired pulse generator 514 ensures that the duration of the $T_{ON2}$ pulse is the same as the $T_{ON1}$ pulse for pulse-pairing mode, so that $T_{ON2}$ is asserted back low at subsequent time t6. The time from t5 to t6 for the $T_{ON2}$ pulse is the same as the time from t1 to t2 for the $T_{ON1}$ pulse. At time t6, the drive control circuitry 312 turns M1 off and turns M2 on causing $i_{IND}$ to decrease completing the second pulse 1B at subsequent time t7. Although not shown, the OFF time $T_{OFF2}$ of the second pulse 1B occurs between times t6 and t7, during which time TOFF is asserted.

Since $T_{ON1}=T_{ON2}$, and since the off-time conditions are about the same for the pair of pulses, the duration $T_{pulse2}$ of the second pulse 1B is the same as the duration $T_{pulse1}$ of the first pulse 1A. The pulses 1A and 1B are separated by the pulse separation interval $T_d$.

The LV signal is asserted again at subsequent time t8 beginning a new pulse pair including first pulse 2A and second pulse 2B. $T_{ON1}$ is high from t8 to t9 having a duration greater than the ON time for pulse 1A from t1 to t2 since $N_{ONMAX}$ has increased. Pulse 2A completes at time t10, and then after the pulse separation interval $T_d$ from time t8, pulse 2B begins at time t11. $T_{ON2}$ goes high from time t11 to time 12 for the second pulse 2B having the same ON time duration as the ON time for the first pulse 2A from time t8 to time t9. The second pulse 2A completes at time t13, in which the pair of pulses 2A and 2B are substantially the same and are separated by the same pulse separation interval $T_d$. It is noted that since LV is sampled low at time t11, LVS goes low and $N_{ONMAX}$ is decreased. Although not shown, the ON time for the next pulse may be reduced.

Figure 8:
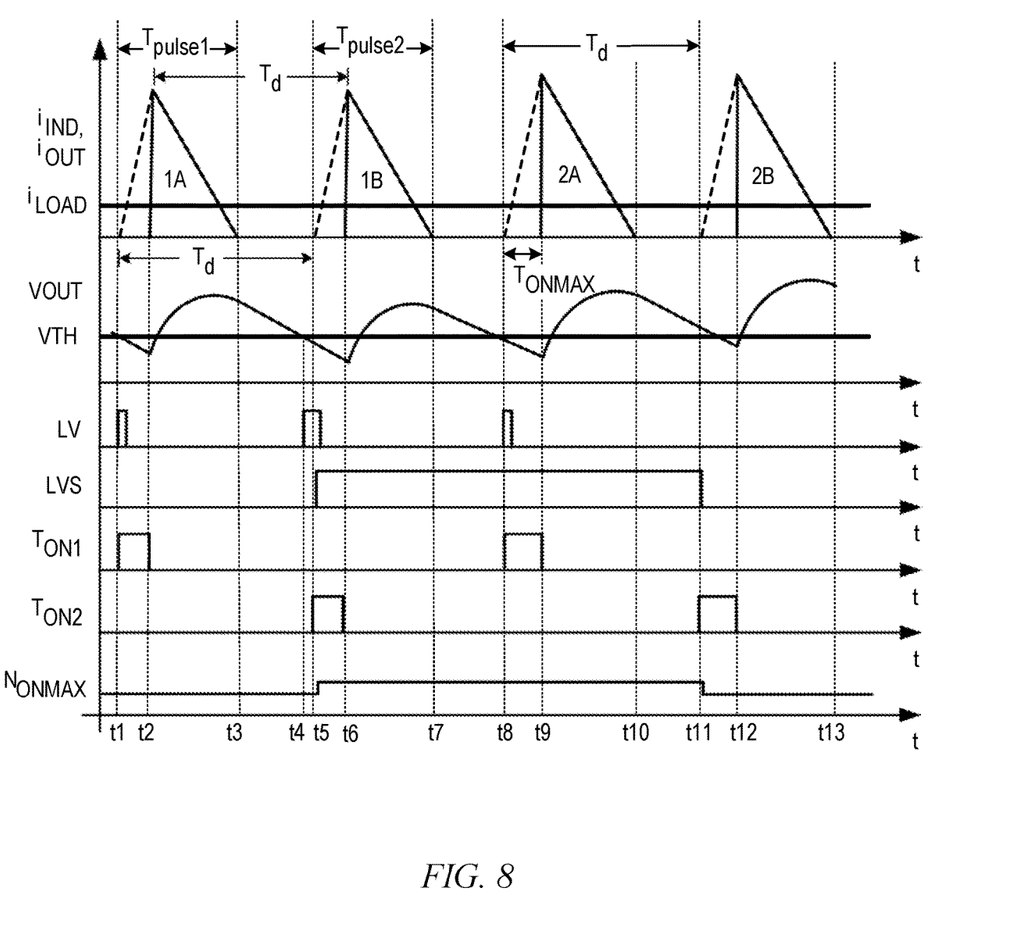
FIG. 8 is a timing diagram illustrating operation of the DC-DC boost converter of FIG. 4 in the pulse-pairing mode using the pulse pairing circuitry of FIG. 5 according to one embodiment of the present disclosure.

FIG. 8 is a timing diagram illustrating operation of the DC-DC boost converter 400 in the pulse-pairing mode using the pulse pairing circuitry 510 according to one embodiment of the present disclosure. The signals $i_{IND}$, $i_{OUT}$, $i_{LOAD}$, VOUT, VTH, LV, LVS, $T_{ON1}$, $T_{ON2}$ and $N_{ONMAX}$ are plotted versus time (t). In this case, the output current $i_{OUT}$ is also plotted and superimposed together with $i_{IND}$. For each of the pulses 1A, 1B, 2A and 2B, the inductor current $i_{IND}$ increases when $T_{ON1}$ or $T_{ON2}$ is asserted during the ON shown as a dashed line, while the output current $i_{OUT}$ remains substantially zero. When the ON time ends and the OFF time begins, the output current $i_{OUT}$ then shoots up to follow $i_{IND}$ current for the remainder of each pulse. This is true since M1 is off while M2 is on during the ON time, and then M2 is turned off and M1 is turned on during the OFF time so that the inductor current $i_{IND}$ essentially flows as the output current $i_{OUT}$ during the remainder of each pulse. The load current $i_{LOAD}$ is plotted with $i_{IND}$ and shown in simplified form as a nonvarying load line. The low voltage threshold VTH is plotted with VOUT.

Operation is substantially similar as that described for the DC-DC buck converter 300. LV is asserted to begin each pulse-pair at times t1 and t8, in which the ON time is dictated by $T_{ON1}$ for the first pulse 1A (time t1 to t2) and 2A (time t8 to t9), and dictated by $T_{ON2}$ for the second pulse 1B (time t5 to t6) and 2B (time t11 to t12) for each pulse-pair. Pulse 1A ends at time t3, pulse 1B ends at time t7, pulse 2A ends at time t10, and pulse 2B ends at time t13. The pulses of each pulse pair are separated by the same pulse separation interval $T_d$. VOUT falls below VTH at subsequent time t4 causing LV to be asserted high, but this is ignored since before expiration of $T_d$. LV is sampled high at time t5 so that LVS goes high and $N_{ONMAX}$ is increased, so that the ON time for the second pair of pulses 1A and 2B is increased. LV is sampled low at time t11 so that $N_{ONMAX}$ is decreased.

Figure 9:
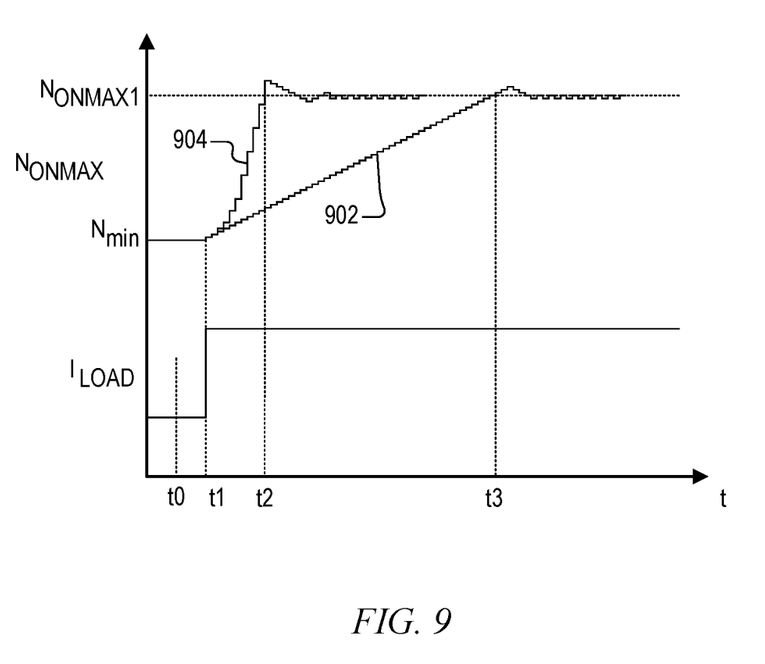
FIG. 9 is a timing diagram illustrating operation of the maximum on timing controller of FIG. 5 for adjusting a maximum on time value in response to an increase of the load according to various embodiments of the present disclosure.

FIG. 9 is a timing diagram illustrating operation of the on timing circuitry 512 for adjusting $N_{ONMAX}$ in response to an increase of the load according to various embodiments of the present disclosure. $N_{ONMAX}$ and $i_{LOAD}$ are both plotted versus time, in which $N_{ONMAX}$ is plotted both for a fixed-step digital integrator (or accumulator) and for a variable-step digital integrator. At an initial time t0, $N_{ONMAX}=N_{min}$ for a low load condition. At subsequent time t1, $i_{LOAD}$ suddenly increases so that $N_{ONMAX}$ is incrementally increased over time to a settled value shown as $N_{ONMAX}=N_{ONMAX1}$ to match the increased load.

A first plot 902 illustrates a first embodiment in which the on timing circuitry 512 is implemented as a simple, unit-step or one-step accumulator in which the step is fixed. In this case, $N_{ONMAX}$ is increased by the same unit step S for each clock cycle until it reaches (or exceeds) $N_{ONMAX1}$ at about a subsequent time t3, and then settles back down to $N_{ONMAX1}$ after a few additional clock cycles.

A second plot 904 illustrates a second embodiment in which the on timing circuitry 512 is implemented as a variable-step or one-step accumulator. In this case, $N_{ONMAX}$ is increased by increasing step amounts for each clock cycle until it reaches (or exceeds) $N_{ONMAX1}$ at about a subsequent time t2, and then settles back down to $N_{ONMAX1}$ after a few additional clock cycles. The first step increase may be the unit step S, but the second step is increased, such as 2S, the third step is increased even more, such as 4S, and so on. A maximum step size may be defined to avoid instability and/or excessive overshoot when $N_{ONMAX}$ reaches its final value $N_{ONMAX1}$. As compared to the first embodiment illustrated by plot 902, the second embodiment reaches $N_{ONMAX1}$ significantly faster (t2<<t3) than the first embodiment to increase the speed of the loop for a faster load response.

The present description has been presented to enable one of ordinary skill in the art to make and use the present invention as provided within the context of particular applications and corresponding requirements. The present invention is not intended, however, to be limited to the particular embodiments shown and described herein, but is to be accorded the widest scope consistent with the principles and novel features herein disclosed. Many other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention.

The invention claimed is:

1. A DC-DC converter, comprising:
DC-DC converter circuitry that switches current through an inductive element based on an on time signal between a zero current level and a peak current level to convert a source voltage to an output voltage;
a voltage detector that asserts a low voltage signal when the output voltage reaches a minimum voltage threshold;
pulse-pairing circuitry, comprising:
a paired pulse generator that activates, in response to assertion of the low voltage signal, the on signal for a first time period and then for a second time period in which the first and second time periods are separated by a predetermined pulse separation interval, wherein the first time period has a duration based on an adjustable time value and a peak current indication and wherein the second time period is the same as the first time period;
a load detector that receives the low voltage signal and an off signal indicative of an off time, and that provides a load adjust signal having a first level when the off signal is detected asserted or the low voltage signal is detected de-asserted at a beginning of the second time period, and having a second level when the detected off signal is de-asserted and the detected low voltage signal is asserted at a beginning of the second time period; and
a maximum on time controller that adjusts the adjustable time value based on the load adjust signal.

2. The DC-DC converter of claim 1, wherein the DC-DC converter circuitry comprises:
a first switch having current terminals coupled between the source voltage and an intermediate node, and having a control terminal;
a second switch having current terminals coupled between the intermediate node and a source voltage reference node, and having a control terminal;
the inductive element having a first terminal coupled to the intermediate node and having a second terminal coupled to an output node developing the output voltage; and
drive control circuitry that provides a first drive signal to the control terminal of the first switch and that provides a second drive signal to the control terminal of the second switch, wherein the drive control circuitry asserts the first drive signal while the on signal is active and then asserts the second drive signal until a zero current indication or until the on signal next goes active;
wherein the second drive signal is provided as the off signal to the load detector.

3. The DC-DC converter of claim 1, wherein the DC-DC converter circuitry comprises:
a first switch having current terminals coupled between the output voltage and an intermediate node, and having a control terminal;
a second switch having current terminals coupled between the intermediate node and a source voltage reference node, and having a control terminal;
the inductive element having a first terminal coupled to the intermediate node and having a second terminal coupled to receive the source voltage; and
drive control circuitry that provides a first drive signal to the control terminal of the first switch and that provides a second drive signal to the control terminal of the second switch, wherein the drive control circuitry asserts the second drive signal while the on signal is active and then asserts the first drive signal until a zero current indication or until the on signal next goes active;

wherein the first drive signal is provided as the off signal to the load detector.

4. The DC-DC converter of claim 1, wherein the voltage detector comprises a comparator that compares the output voltage with a minimum threshold voltage and provides the low voltage signal.

5. The DC-DC converter of claim 1, wherein the pulse separation interval is fixed between each pulse pair and based on a clock signal having a selected frequency to provide a target notch frequency in a frequency spectrum of a train of paired pulses.

6. The DC-DC converter of claim 1, wherein the paired pulse generator activates the on signal for a first pulse in response to assertion of the low voltage signal and deactivates the on signal after the first time period in response to a first occurrence of expiration of a time period indicated by the adjustable time value and a peak current indication, and then activates the on signal again after the pulse separation interval for a second pulse and deactivates the on signal after the second time period being the same as the first time period.

7. The DC-DC converter of claim 6, wherein the load detector comprises:
a first latch that samples the low voltage signal when the on signal is activated for the second pulse and that provides a sampled low voltage signal;
a second latch that samples the off signal when the on signal is activated for the second pulse and that provides a sampled off signal; and
a Boolean logic AND gate having a first input receiving the sampled low voltage signal, having a second input receiving the sampled off signal, and having an output providing the load adjust signal.

8. The DC-DC converter of claim 1, wherein the maximum on time controller decreases the adjustable time value when the load adjust signal is at the first level and increases the adjustable time value when the load adjust signal is at the second level.

9. The DC-DC converter of claim 1, wherein the maximum on time controller comprises a fixed-step digital accumulator.

10. The DC-DC converter of claim 1, wherein the maximum on time controller comprises a variable-step digital accumulator.

11. A method of operating a DC-DC converter in pulse-pairing mode, comprising:
switching current through an inductive element based on an on time signal between a zero current level and a peak current level to convert a source voltage to an output voltage;
asserting a low voltage signal when the output voltage reaches a minimum voltage threshold;
activating, in response to assertion of the low voltage signal, the on signal for a first pulse until a peak current indication is received or upon expiration of an adjustable time period;
after a fixed pulse separation interval from when the on signal is activated for the first pulse, activating the on signal for a second pulse for the same duration as for the first pulse;
when the on signal is asserted for the second pulse, asserting a load adjust signal at a first level when the zero current level is not reached or when the low voltage signal is not asserted, and asserting the load adjust signal at a second level when the zero current level is reached and the low voltage signal is asserted; and
adjusting a duration of the adjustable time period based on the load adjust signal.

12. The method of claim 11, wherein the switching comprises:
coupling the inductive element between the source voltage and the output voltage when the on signal is active for the first and second pulses; and
when the on signal becomes inactive for the first and second pulses, coupling the inductive element between a source reference voltage and the output voltage until the zero current level is reached.

13. The method of claim 11, wherein the switching comprises:
coupling the inductive element between the source voltage and a source reference node when the on signal is active for the first and second pulses; and
when the on signal becomes inactive for the first and second pulses, coupling the inductive element between the source voltage and the output voltage until the zero current level is reached.

14. The method of claim 11, wherein the asserting a low voltage signal comprises comparing the output voltage with a minimum threshold voltage.

15. The method of claim 11, further comprising using a clock signal and a fixed value to determine the fixed pulse separation interval to provide a target notch frequency in a frequency spectrum of a train of paired pulses.

16. The method of claim 11, further comprising:
counting cycles of a clock signal using an adjustable value to determine the adjustable time period; and
counting cycles of a clock signal using a fixed value to determine the fixed pulse separation interval.

17. The method of claim 11, wherein asserting the load adjust signal at the first level or the second level comprises: sampling the low voltage signal when the on signal is activated for the second pulse and providing a sampled low voltage signal; providing an off signal indicative of an off time of the first and second pulses until current through the inductive element reaches the zero current level; sampling the off signal when the on signal is activated for the second pulse and providing a sampled off signal; and asserting the load adjust signal at the first level when the sampled off signal is asserted or when the sampled low voltage signal is de-asserted, and asserting the load adjust signal at the second level when the sampled off signal is de-asserted and the sampled low voltage signal is asserted.

18. The method of claim 11, further comprising decreasing the adjustable time value when the load adjust signal is at the first level and increasing the adjustable time value when the load adjust signal is at the second level.

19. The method of claim 11, further comprising adjusting an adjustable value by fixed steps based on the load adjust signal and converting the adjustable value to the adjustable time value.

20. The method of claim 11, further comprising adjusting an adjustable value by variable steps based on the load adjust signal and converting the adjustable value to the adjustable time value.

* * * * *